United States Patent
Mei et al.

(10) Patent No.: US 12,337,310 B2
(45) Date of Patent: Jun. 24, 2025

(54) APPARATUS AND PROCESS FOR THE GAS-PHASE POLYMERIZATION

(71) Applicant: Basell Polyolefine GmbH, Wesseling (DE)

(72) Inventors: Giulia Mei, Ferrara (IT); Giuseppe Penzo, Mantova (IT); Riccardo Rinaldi, Ferrara (IT); Emanuele Azzarello, Ferrara (IT); Rosario Pesare, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 613 days.

(21) Appl. No.: 17/783,170

(22) PCT Filed: Dec. 9, 2020

(86) PCT No.: PCT/EP2020/085233
§ 371 (c)(1),
(2) Date: Jun. 7, 2022

(87) PCT Pub. No.: WO2021/116156
PCT Pub. Date: Jun. 17, 2021

(65) Prior Publication Data
US 2023/0016760 A1    Jan. 19, 2023

(30) Foreign Application Priority Data
Dec. 11, 2019 (EP) .................................. 19215247

(51) Int. Cl.
*B01J 8/18* (2006.01)
*B01J 8/00* (2006.01)
(Continued)

(52) U.S. Cl.
CPC .............. *B01J 8/1827* (2013.01); *B01J 8/005* (2013.01); *B01J 8/0055* (2013.01); *B01J 8/1863* (2013.01);
(Continued)

(58) Field of Classification Search
CPC ........ B01J 8/1827; B01J 8/005; B01J 8/0055; B01J 8/1863; B01J 8/26; B01J 19/2435; C08F 10/00
(Continued)

(56) References Cited

U.S. PATENT DOCUMENTS 10,781,273 B2    9/2020  Curren et al.
2004/0136881 A1  7/2004  Verser et al.
(Continued)

FOREIGN PATENT DOCUMENTS

CN    101080270 B  *  9/2013  .......... B01J 19/2465
EP    3321288 A1      5/2018
(Continued)

OTHER PUBLICATIONS

The International Search Report and The Written Opinion for PCT/EP2020/085233 mailed Feb. 16, 2021.
(Continued)

*Primary Examiner* — Huy Tram Nguyen

(57) ABSTRACT

An apparatus for carrying out a gas-phase olefin polymerization having a first polymerization zone having a cylindrical segment of diameter D01, a second polymerization zone having a cylindrical upper part of diameter D05 and a cylindrical lower part of diameter D06, a separation zone of diameter D04, a first connecting element of diameter D03, which is a bend of radius R03 or has a bend part of radius R03, a gas recycle line of diameter D08, a transition segment of diameter D02, and a second connecting element of a diameter D09, which is a bend or has a bend part, wherein
(Continued)

the ratio D04 to D05 is 1.0 to 1.5, the ratio D05 to D06 is 1.2 to 2, the ratio R03 to D03 is 1 to 6, the ratio D03 to D01 is 0.3 to 0.85, and the ratio D08 to D02 is 1.0 to 2.2.

20 Claims, 5 Drawing Sheets

(51) Int. Cl.
 *B01J 8/26* (2006.01)
 *B01J 19/24* (2006.01)
 *C08F 10/00* (2006.01)

(52) U.S. Cl.
 CPC .............. *B01J 8/26* (2013.01); *B01J 19/2435* (2013.01); *C08F 10/00* (2013.01)

(58) Field of Classification Search
 USPC ........................................................ 422/132
 See application file for complete search history.

(56) References Cited

U.S. PATENT DOCUMENTS

| | | |
|---|---|---|
| 2007/0049782 A1 | 3/2007 | Patel et al. |
| 2013/0165605 A1* | 6/2013 | Soffritti ...................... B01J 8/44 422/131 |

FOREIGN PATENT DOCUMENTS

| | | |
|---|---|---|
| JP | 2015529271 A | 10/2015 |
| JP | 2019533749 A | 11/2019 |
| KR | 20130138736 A | 12/2013 |
| RU | 2472774 C1 | 1/2013 |
| WO | 9704015 A1 | 2/1997 |
| WO | 0002929 A1 | 1/2000 |
| WO | 2012031986 A1 | 3/2012 |
| WO | 2018115236 A1 | 6/2018 |
| WO | 2019154756 A1 | 8/2019 |

OTHER PUBLICATIONS

D. Geldart, Gas Fluidization Technology, pp. 155-196, J. Wiley & Sons Ltd., 1986.

* cited by examiner

APPARATUS AND PROCESS FOR THE GAS-PHASE POLYMERIZATION

This application is the U.S. National Phase of PCT International Application PCT/EP2020/085233, filed Dec. 9, 2020, claiming benefit of priority to European Patent Application No. 19215247.8, filed Dec. 11, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides an apparatus for carrying out a gas-phase olefin polymerization.

BACKGROUND OF THE INVENTION

Polyolefins are a class of synthetic polymers used because of the polymers' low costs of production, light weight, and high chemical resistance. In some instances, mechanical properties are achieved through copolymerization, blending, and additives.

In some instances, polyolefins are produced by gas-phase polymerization, wherein polyolefin particles are produced in a gaseous reaction medium containing the monomers. In some instances, the generated heat of reaction is removed by withdrawing the reaction gas mixture from the reactor, cooling the gas mixture in a heat exchanger, and sending the cooled gas mixture back into the reactor. In some instances, the composition of the gas-phase controls the composition of the resulting polymer. In some instances, gas-phase polymerization processes do not control adequately the molecular weight distribution of the resulting polymers nor the comonomer compositions of resulting copolymers.

SUMMARY OF THE INVENTION

In a general embodiment, the present disclosure provides an apparatus for carrying out a gas-phase olefin polymerization having
- a first polymerization zone, adapted and arranged for growing polymer particles to flow upward under fast fluidization or transport conditions, having a cylindrical segment having a diameter $D01$;
- a second polymerization zone, adapted and arranged for the growing polymer particles to flow downward, having a cylindrical upper part having a diameter $D05$ and a cylindrical lower part having a diameter $D06$;
- a gas/solid separation zone of a cylindrical shape having a diameter $D04$, adapted and arranged for separating growing polymer particles from a gas flow, which is arranged on top of the upper part of the second polymerization zone and directly connected to the upper part of the second polymerization zone;
- a tubular first connecting element having a diameter $D03$, adapted and arranged for connecting the cylindrical segment of the first polymerization zone to the gas/solid separation zone;
- a tubular gas recycle line having a diameter $D08$, adapted and arranged for connecting the gas/solid separation zone to the first polymerization zone;
- a tubular transition segment having a diameter $D02$, arranged between the gas recycle line and the cylindrical segment of the first polymerization zone; and
- a tubular second connecting element having a diameter $D09$, adapted and arranged for connecting the lower part of the second polymerization zone to the transition segment;
- wherein the gas recycle line is equipped with a compressor, adapted and arranged for circulating gas in the gas recycle line, and a heat exchanger, adapted and arranged for removing heat from the gas flowing in the gas recycle line;
- wherein the ratio of $D04$ to $D05$ is from 1.0 to 1.5 and the ratio of $D05$ to $D06$ is from 1.2 to 2;
- wherein the first connecting element is a bend having a radius $R03$ or a tubular element, having one or more bend parts having one or more radiuses $R03$ and one or more linear parts, the ratio of $R03$ to $D03$ is from 1 to 6, and the ratio of $D03$ to $D01$ is from 0.3 to 0.85;
- wherein the first connecting element has a connecting piece, the first connecting element and the gas/solid separation zone are connected by the connecting piece, and the connection of the connecting piece to the gas/solid separation zone is tangential and has an inclination, so that the central axis of the connecting piece and the horizontal form an angle $A16$ in the range from 0° to 40°;
- wherein the transition segment is a bend or a tubular element, having one or more bend parts and one or more linear parts, and the ratio of $D08$ to $D02$ is 1.0 to 2.2; and
- wherein the second connecting element is a bend or a tubular element, having one or more bend parts and one or more linear parts.

In some embodiments, the central axis of the second connecting element at the position where the second connecting element is connected to the transition segment and the horizontal form an angle $A02$ in the range from 0° to 40°.

In some embodiments, the apparatus further has a line for feeding a barrier gas, a barrier liquid, or a combined gas/liquid barrier into the upper part of the second polymerization zone.

In some embodiments, the apparatus further has a line for feeding a transport gas into an upper part of the second connecting element.

In some embodiments, the second connecting element is provided with a gas distribution grid extending from the upper end of the second connecting element for an angle $A09$ of at least 50° along the bending of the second connecting element.

In some embodiments, the second polymerization zone has a throttling valve, and the apparatus further has a line for feeding a dosing gas into the lower part of the second polymerization zone at one or more positions above the throttling valve.

In some embodiments, the compressor is a centrifugal compressor having variable guide vanes, and the gas recycle line is further equipped with a butterfly valve.

In some embodiments, the variable guide vanes are arranged upstream of the centrifugal compressor, and the butterfly valve is arranged downstream of the centrifugal compressor In some embodiments, the gas/solid separation zone has a height $H04$, and the ratio of $H04$ to $D04$ is 2.5 to 4.5.

In some embodiments, the upper part of the second polymerization zone has a height $H05$, and the ratio of $H05$ to $D05$ is 2 to 4.

In some embodiments, the apparatus is part of a series of polymerization reactors.

In some embodiments, the present disclosure further provides a process for carrying out a gas-phase olefin polymerization in the apparatus at temperatures of from 20° C. to 200° C. and pressures of from 0.5 MPa to 10 MPa, in the presence of a polymerization catalyst. In some embodiments, the process includes the steps of (a) feeding one or more olefins into the apparatus, (b) contacting the olefins and the polymerization catalyst under reaction conditions, and (c) discharging the polymer product from the apparatus, wherein the growing polymer particles (i) flow upward through the first polymerization zone under fast fluidization or transport conditions, (ii) leave the first polymerization zone, (iii) pass through the gas/solid separation zone, (iv) enter the second polymerization zone, (v) flow downward under the action of gravity, (vi) leave the second polymerization zone, and (vii) are reintroduced, at least partially, into the first polymerization zone, thereby establishing a circulation of polymer between the first polymerization zone and the second polymerization zone, wherein the second polymerization zone is made from or containing a bed of densified polymer particles.

In some embodiments, introducing a gas or liquid into the second polymerization zone via a feeding line prevents completely or partially the gas mixture in the first polymerization zone from entering the upper part of the second polymerization zone, and the gas mixture in the second polymerization zone differs from the gas mixture in the first polymerization zone.

In some embodiments, the surface of the bed of densified polymer particles is located in the upper part of the second polymerization zone.

In some embodiments, the polymerization is a homopolymerization of ethylene, a copolymerization of ethylene and one or more other olefins selected from the group consisting of 1-butene, 1-hexene, and 1-octene, a homopolymerization of propylene, or a copolymerization of propylene and one or more other olefins selected from the group consisting of ethylene, 1-butene, and 1-hexene.

DETAILED DESCRIPTION OF THE INVENTION

Figure 1:
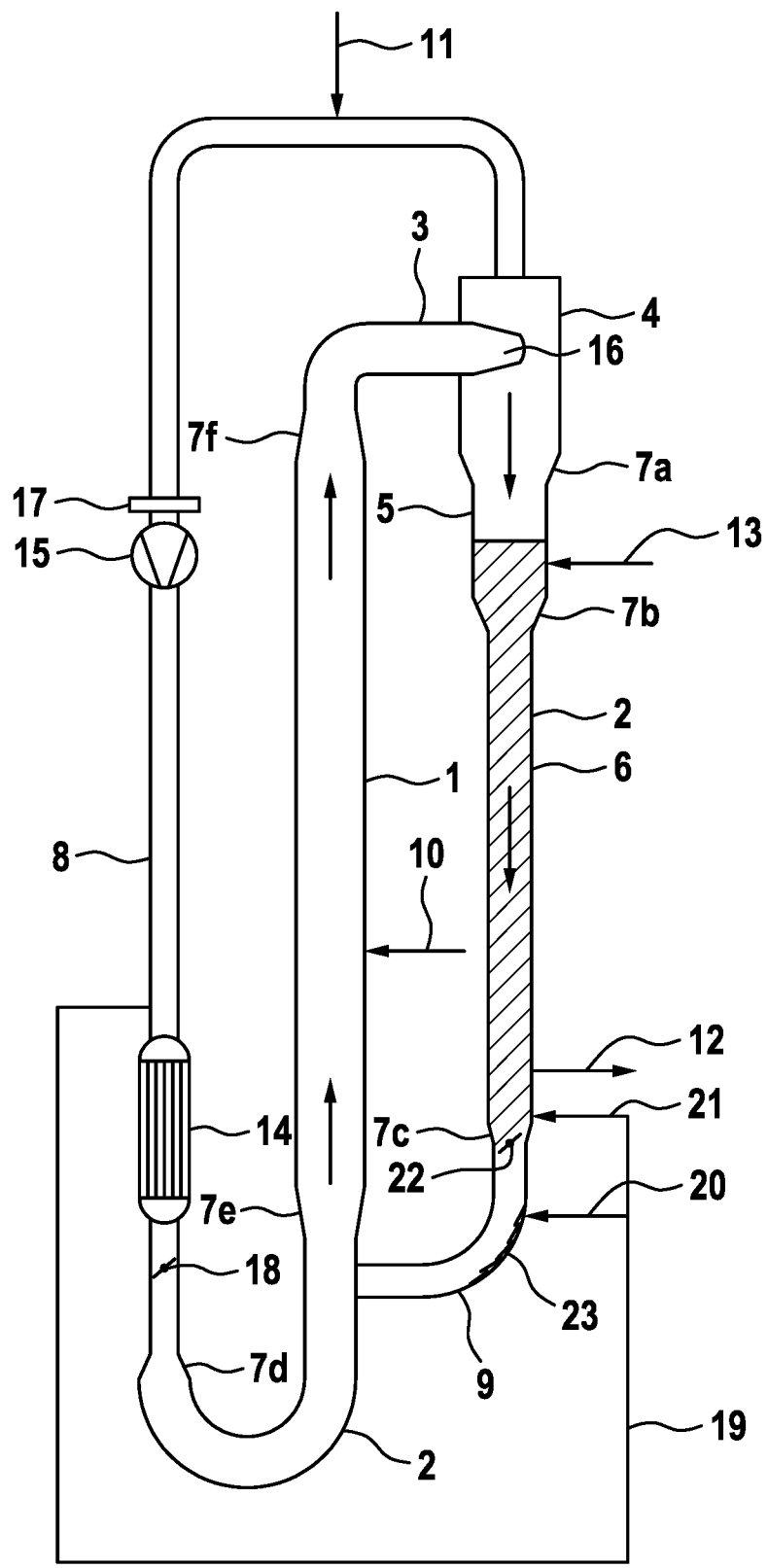
FIG. 1 is a schematic of an apparatus for carrying out a gas-phase olefin polymerization.

In some embodiments, the present disclosure provides an apparatus for carrying out a gas-phase olefin polymerization having
 a first polymerization zone adapted and arranged for growing polymer particles to flow upward under fast fluidization or transport conditions;
 a second polymerization zone adapted and arranged for the growing polymer particles to flow downward;
 a gas/solid separation zone adapted and arranged for separating growing polymer particles from a gas flow which is arranged on top of the second polymerization zone and directly connected to the second polymerization zone;
 a first connecting element adapted and arranged for connecting the top of the first polymerization zone to the gas/solid separation zone;
 a gas recycle line adapted and arranged for connecting the gas/solid separation zone to the bottom of the first polymerization zone; and
 a second connecting element adapted and arranged for connecting the bottom of the second polymerization zone to the bottom of the first polymerization zone.

In some embodiments, a line for catalyst feed or for feeding polymer particles from an upstream polymerization reactor is arranged on the first polymerization zone and a polymer discharge line is located at a bottom portion of the second polymerization zone. In some embodiments, make-up monomers, comonomers, hydrogen, inert components, or combinations thereof are introduced at various points along the first or the second polymerization zone or at the gas recycle line.

In some embodiments, the olefins are 1-olefins, that is, hydrocarbons having terminal double bonds, without being restricted thereto. In some embodiments, the olefins are nonpolar olefinic compounds. In some embodiments, the 1-olefins are linear or branched $C_2$-$C_{12}$-1-alkenes, conjugated dienes, nonconjugated dienes, and mixtures of various 1-olefins. In some embodiments, the 1-olefins are linear $C_2$-$C_{10}$-1-alkenes or branched $C_2$-$C_{10}$-1-alkenes. In some embodiments, the linear $C_2$-$C_{10}$-1-alkenes are selected from the group consisting of ethylene, propylene, 1-butene, 1-pentene, 1-hexene, 1-heptene, 1-octene, and 1-decene. In some embodiments, the branched $C_2$-$C_{10}$-1-alkene is 4-methyl-1-pentene. In some embodiments, the conjugated and nonconjugated dienes are selected from the group consisting of 1,3-butadiene, 1,4-hexadiene, and 1,7-octadiene. In some embodiments, the olefins have the double bond as part of a cyclic structure. In some embodiments, the cyclic structure has one or more ring systems. In some embodiments, the olefins having a cyclic structure are selected from the group consisting of cyclopentene, norbornene, tetracyclododecene, methylnorbornene. 5-ethylidene-2-norbornene, norbornadiene, and ethylnorbornadiene. In some embodiments, the polymerization involves mixtures of two or more olefins.

In some embodiments, the apparatus of the present disclosure is used for the homopolymerization or copolymerization of ethylene or propylene. In some embodiments, the comonomers in propylene polymerization are up to 40 wt. % of ethylene, 1-butene, 1-hexene, or combinations thereof, alternatively from 0.5 wt. % to 35 wt. % of ethylene, 1-butene, 1-hexene, or combinations thereof. In some embodiments, the comonomers in ethylene polymerization are up to 20 wt. %, alternatively from 0.01 wt. % to 15 wt. %, alternatively from 0.05 wt. % to 12 wt. %. In some embodiments, the comonomers in ethylene polymerization are $C_3$-$C_8$-1-alkenes. In some embodiments, the $C_3$-$C_8$-1-alkenes are selected from the group consisting of 1-butene, 1-pentene, 1-hexene, 1-octene, and combinations thereof. In some embodiments, ethylene is copolymerized with from 0.1 wt. % to 12 wt. % of 1-hexene, 1-butene, and combinations thereof.

In some embodiments, the apparatus has a first polymerization zone adapted and arranged for growing polymer particles to flow upward under fast fluidization or transport conditions. In some embodiments, the first polymerization zones are designated "risers." In some embodiments, the first polymerization zone has a cylindrical segment having a diameter D01. In some embodiments, and in the first polymerization zone, fast fluidization conditions or transport are established by a stream of a reaction gas mixture flowing from the bottom of the first polymerization zone to the top of the first polymerization zone at a velocity higher than the transport velocity of the polymer particles. In some embodiments, the velocity of the reaction gas mixture is from 0.5 m/s to 15 m/s, alternatively from 0.8 m/s to 5 m/s. In some embodiments, the terms "transport velocity" and "fast fluidization conditions" are as defined in "D. Geldart, Gas Fluidization Technology, page 155 et seq, J. Wiley & Sons Ltd., 1986".

In some embodiments, the apparatus further has a second polymerization zone adapted and arranged for the growing polymer particles to flow downward. In some embodiments, the second polymerization zones are designated as "downcomers." In other embodiments, a polymerization unit is designated "moving bed" unit, "moving bed" reactor, "settled bed" unit, or "settled bed" reactor. In some embodiments, the second polymerization zone has a cylindrical upper part having a diameter D05 and a cylindrical lower part having a diameter D06. In some embodiments, and in the second polymerization zone, the growing polymer particles flow downward in a densified form under the action of gravity. As used herein, the term "densified form" of the polymer refers to the ratio between the mass of polymer and the reactor volume being higher than 80% of the "poured bulk density" of the resulting polymer. For example, when a polymer bulk density is equal to 420 kg/m$^3$, a "densified form" of the polymer means that the polymer mass/reactor volume ratio is at least 336 kg/m$^3$. The "poured bulk density" of a polymer is a parameter measured according to DIN EN ISO 60:1999. In some embodiments, the second polymerization zone contains a bed of growing polymer particles, which moves downwards in a plug flow mode. As used herein, the term "plug flow mode" refers to little or no backmixing of the polymer particles. In some embodiments, the polymer particles flow downwards with a velocity of from 0.01 m/s to 0.7 m/s, alternatively from 0.1 m/s to 0.6 m/s, alternatively from 0.15 m/s to 0.5 m/s.

In some embodiments, the apparatus further has a gas/solid separation zone of a cylindrical shape adapted and arranged for separating growing polymer particles from a gas flow. In some embodiments, the gas/solid separation zone is arranged on top of the upper part of the second polymerization zone and directly connected to the upper part of the second polymerization zone. The gas/solid separation zone has a diameter D04. In some embodiments, and in the gas/solid separation zone, the mixture of growing polyolefin particles and reaction gas coming from the first polymerization zone through the first connection element is separated in reaction gas and polymer particles. In some embodiments, the polymer particles enter the second polymerization zone, and the separated reaction gas mixture coming from the first polymerization zone is transferred into the gas recycle line for recycling to the first polymerization zone.

In some embodiments, the apparatus has a line for feeding a gas, a liquid, or both into the upper part of the second polymerization zone. In some embodiments, the gas, the liquid, or both form a barrier fluid fed in the form of a gas, a liquid, or a combined gas/liquid mixture. In some embodiments, feeding a barrier fluid establishes different polymerization conditions in the first and the second polymerization zones by partially or totally preventing the reaction gas mixture of the first polymerization zone from entering the second polymerization zone. In some embodiment, the barrier fluid has a composition different from the reaction gas mixture in the first polymerization zone. In some embodiments, the amount of added barrier fluid is adjusted such that an upward flow of gas countercurrent to the flow of the polymer particles is generated at the top of the second polymerization zone, thereby acting as a barrier to the gas mixture entrained with the polymer particles coming from the gas/solid separation zone. In some embodiments, the barrier fluid comes from a recycle gas stream. In some embodiments, the recycle gas stream is obtained by partly condensing the stream. In some embodiments, the barrier fluid is made from or containing the monomers to be polymerized, inert compounds used as a polymerization diluent, hydrogen, and other components of the reaction gas mixture. In some embodiments, the inert compounds are nitrogen or alkanes having from 1 to 10 carbon atoms.

In some embodiments, the surface of the bed of densified polymer particles is located in the upper part of the second polymerization zone. In some embodiments, the gas, the liquid, or the combination thereof, acting as barrier fluid for partially or totally preventing the reaction gas mixture of the first polymerization zone from entering the second polymerization zone, is fed into the bed of densified polymer particles at a position close to the surface of the bed of densified polymer particles.

In some embodiments, the apparatus further has additional feeding lines for feeding a gas, a liquid, or both into the second polymerization zone. In some embodiments, these additional feeding lines are utilized for replacing reacted monomers and controlling the gas flow within the second polymerization zone. In some embodiments, the feed streams are made from or containing the main monomer of the polymerization. In some embodiments, the feed streams are further made from or containing one or more comonomers, inert components, or hydrogen. In some embodiments, the inert component is propane. In some embodiments, depending on the amount of gas. liquid, or both added to the second polymerization zone and the pressure conditions within the second polymerization zone, the gaseous medium surrounding the polymer particles move downward concurrently with the polymer particles or upward countercurrently to the polymer particles. In some embodiments, liquid streams fed to the second polymerization zone vaporize within the second polymerization zone, thereby contributing to the composition of the reaction gas mixture within the second polymerization zone. In some embodiments, the feeding points for introducing additional feed streams of the gas, the liquid, or both into the second polymerization zone are evenly distributed over the height of the second polymerization zone. In some embodiments, gas, liquid, or combined gas/liquid mixtures of different composition are fed through the different feeding lines, thereby establishing sub-zones, having different reaction gas compositions, in different parts of the second polymerization zone and producing polymers of different composition.

In some embodiments, the apparatus has the ratio of the diameter of the gas/solid separation zone D04 to the diameter of the upper part of the second polymerization zone D05, that is, the ratio of D04 to D05, from 1.0 to 1.5, alternatively from 1.05 to 1.4, alternatively from 1.08 to 1.3. In some embodiments, selection of the ratio of the diameter of the gas/solid separation zone to the diameter of the upper part of the second polymerization zone provides an efficient gas/solid separation in the separation zone, thereby ensuring separation of the reaction gas mixture in the first polymerization zone from the reaction gas mixture within the second polymerization zone.

In some embodiments, the gas/solid separation zone has a height H04 and the ratio of the height of the gas/solid separation zone H04 to the diameter of the gas/solid separation zone D04, that is, the ratio of H04 to D04, is from 2.5 to 4.5, alternatively from 2.8 to 4.2, alternatively from 2.9 to 4. In some embodiments, selection of the ratio of the height of the separation zone to the diameter of the separation zone provides for effective separation of the gas/solid mixture introduced into the separation zone from the first polymerization zone.

In some embodiments, the apparatus has the ratio of the diameter of the upper part of the second polymerization zone D05 to the diameter of the lower part of the second polymerization zone D06, that is, the ratio of D05 to D06, from 1.2 to 2, alternatively from 1.3 to 1.8, alternatively from 1.4 to 1.7. In some embodiments, the design of the second polymerization zone facilitates separation of the reaction gas mixture of the first polymerization zone from the gas mixture of the second polymerization zone. In some embodiments, the barrier gas, the barrier liquid, or a combination of both is introduced into an upper part of the second polymerization zone, wherein the upper part has a diameter larger than the diameter of a lower part, thereby resulting in a lower velocity of the polymer particles in the upper part of the second polymerization zone than in the lower part of the second polymerization zone and avoiding fluidization.

In some embodiments, the upper part of the second polymerization zone has a height H05 and the ratio of the height of the upper part of the second polymerization zone H05 to the diameter of the upper part of the second polymerization zone D05 (that is, the ratio of H05 to D05) is 2 to 4, alternatively 2 to 3.8, alternatively 2 to 3.6.

In some embodiments, the gas/solid separation zone and the upper part of the second polymerization zone are connected by a first connecting part, wherein the diameter of the first connecting part decreases from the diameter of the gas/solid separation zone D04 to the diameter of the upper part of the second polymerization zone D05. In some embodiments, the upper part of the second polymerization zone and the lower part of the second polymerization zone are connected by a second connecting part, wherein the diameter of the second connecting part decreases from the diameter of the upper part of the second polymerization zone D05 to the diameter of the lower part of the second polymerization zone D06. In some embodiments, the diameter of the first second connecting part. the diameter of the second connecting part, or the diameters of both connecting parts decrease constantly. In some embodiments, the first connecting part and the second connecting part have a frusto-conical shape. In some embodiments, the first connecting part, the second connecting part, or both have a shape of a spherical frustum. In some embodiments, the first connecting part has a frusto-conical shape. In some embodiments, the surface of the first connecting part and the vertical form an angle A07a, which is 5° to 25°, alternatively 8° to 20°, alternatively 10° to 15°. In some embodiments, the second connecting part has a frusto-conical shape. In some embodiments, the surface of the second connecting part and the vertical form an angle A07b, which is 5° to 25°, alternatively 8° to 20°, alternatively 10° to 15°. It is believed that a smooth downward flow of the polymer through the second polymerization zone is ensured when the angles A07a and A07b are kept within the set limits, and stagnation of the polymer powder is reduced.

In some embodiments, the apparatus further has a tubular gas recycle line adapted and arranged for connecting the gas/solid separation zone to the first polymerization zone and a tubular transition segment arranged between the gas recycle line and the cylindrical segment of the first polymerization zone. The gas recycle line has a diameter D08, and the transition segment has a diameter D02.

In some embodiments, the gas recycle line and the transition segment are connected by a fourth connecting part, wherein the diameter of the fourth connecting part increases from the diameter of the gas recycle line D08 to the diameter of the transition segment D02. In some embodiments, the diameter of the fourth connecting part increases constantly. In some embodiments, the fourth connecting part has a frusto-conical shape.

In some embodiments, the gas recycle line is equipped with a compressor adapted and arranged for circulating gas in the gas recycle line and a heat exchanger adapted and arranged for removing heat from the gas flowing in the gas recycle line. In some embodiments, the compressor is a centrifugal compressor having variable guide vanes, and the gas recycle line is further equipped with a butterfly valve. In some embodiments, the variable guide vanes are arranged upstream of the centrifugal compressor, and the butterfly valve is arranged downstream of the centrifugal compressor. In some embodiments, circulating the gas in the gas recycle line by a centrifugal compressor having variable guide vanes and further equipping the gas recycle line with a butterfly valve permits varying (a) the gas flow rate while maintaining a constant differential pressure across the compressor or (b) the differential pressure across the compressor while maintaining a constant gas flow rate.

In some embodiments, the transition segment has a bend or a tubular element, having one or more bend parts and one or more linear parts, and the ratio of the diameter of the gas recycle line D08 to the diameter of the transition segment D02, that is, the ratio of D08 to D02, is from 1.0 to 2.2, alternatively from 1.2 to 2.0, alternatively from 1.3 to 1.9.

In some embodiments, the transition segment and the cylindrical segment of the first polymerization zone are connected by a fifth connecting part, wherein the diameter of the fifth connecting part increases from the diameter of the transition segment D02 to the diameter of the cylindrical segment of the first polymerization zone D01. In some embodiments, the diameter of the fifth connecting part increases constantly. In some embodiments, the fifth connecting part has a frusto-conical shape.

In some embodiments, the shape of the transition segment ensures the fast fluidization or transport conditions in the first polymerization zone, by providing a low pressure drop in the gas recycle line and in the intersection between gas recycle line and first polymerization zone, providing a minimum polymer friction among adjacent polymer particles and between the polymer particles and the wall of the transition segment, and minimizing the space below the polymerization zones.

In some embodiments, the apparatus further has a tubular first connecting element having a diameter D03, adapted and arranged for connecting the cylindrical segment of the first polymerization zone to the gas/solid separation zone, and a tubular second connecting element having a diameter D09, adapted and arranged for connecting the lower part of the second polymerization zone to the transition segment.

In some embodiments, the combination of a first polymerization zone, wherein growing polymer particles flow upward, a second polymerization zone, wherein growing polymer particles flow downward, a gas/solid separation zone arranged on top of the second polymerization zone, and two connecting elements, connecting the top of the first polymerization zone to the gas/solid separation zone and connecting the bottom of the second polymerization zone to an element connected to the bottom of the first polymerization zone, establish a circulation of polymer particles between the two polymerization zones. In some embodiments, the polymer particles pass alternately a plurality of times through these zones.

In some embodiments, the first connecting element has a bend having a radius R03 or a tubular element having one or more bend parts having one or more radiuses R03 and one or more linear parts. In some embodiments, the ratio of the radius R03 of the bend or the one or more radiuses R03 of the one or more bend parts to the diameter of the first connecting element D03, that is, the ratio of R03 to D03, is from 1 to 6, alternatively from 1 to 5, alternatively from 1 to 4. In some embodiments, the radius R03 of the bend or the one or more radiuses R03 of the one or more bend parts vary (that is, different parts of the bend or different bend parts have different radiuses) and the radiuses R03 have the defined ratio of the radius of the bend or of the one or more bend parts to the diameter of the first connecting element.

In some embodiments, the first connecting element has the ratio of the diameter of the first connecting element D03 to the diameter of the cylindrical segment of the first polymerization zone D01 (that is, the ratio of D03 to D01) from 0.3 to 0.85, alternatively from 0.35 to 0.7, alternatively from 0.4 to 0.65.

In some embodiments, the cylindrical segment of the first polymerization zone and the first connecting element are connected by a sixth connecting part, wherein the diameter of the sixth connecting part decreases from the diameter of the cylindrical segment of the first polymerization zone D01 to the diameter of the first connecting element D03. In some embodiments, the diameter of the sixth connecting part decreases constantly. In some embodiments, the sixth connecting part has a frusto-conical shape. In some embodiments, the sixth connecting part has a shape of a spherical frustum.

In some embodiments, the first connecting element also has the first connecting element having a connecting piece, the first connecting element connected by the connecting piece to the gas/solid separation zone, and the connection of the connecting piece tangential to the gas/solid separation zone and inclined such that the central axis of the connecting piece and the horizontal form an angle A16 in the range from 0° to 40°, alternatively from 0° to 30°, alternatively from 0° to 20°.

In some embodiments, the shape of the connecting piece is adapted to the shape of the gas/solid separation zone. In some embodiments, the connecting piece has a diameter decreasing along the connecting piece. In some embodiments, the connecting piece forms a bend, with a constant diameter or with a decreasing diameter.

In some embodiments, the shape of the first connecting element provides a transport velocity for the transfer of polymer particles from the first polymerization zone to the gas/solid separation zone, a minimum polymer friction among adjacent polymer particles and between the polymer particles and the wall of the first connecting element, and separation efficiency in the gas/solid separation zone.

In some embodiments, the second connecting element has a bend or a tubular element having one or more bend parts and one or more linear parts.

In some embodiments, the lower part of the second polymerization zone and the second connecting element are connected by a third connecting part, wherein the diameter of the third connecting part decreases from the diameter of the lower part of the second polymerization zone D06 to the diameter of the second connecting element D09. In some embodiments, the diameter of the third connecting part decreases constantly. In some embodiments, the third connecting part has a frusto-conical shape. In some embodiments, the surface of the third connecting part and the vertical then form an angle A07c. In some embodiments, the angle A07c is 5° to 25°, alternatively 8° to 20°, alternatively 10° to 15°.

In some embodiments, the central axis of the second connecting element at the position where the second connecting element is connected to the transition segment and the horizontal form an angle A02 in the range from 0° to 40°, alternatively 5° to 30°, alternatively 10° to 25°.

In some embodiments, the bottom of the second polymerization zone is equipped with a throttling valve for controlling the flow of the growing polymer particles leaving the second polymerization zone. In some embodiments, the throttling valve is a mechanical valve. In some embodiment, the mechanical valve is selected from the group consisting of single butterfly valve, double butterfly valves, and ball valves. In some embodiments, a stream of a gas is fed into the lower part of the second polymerization zone at one or more positions above the throttling valve to facilitate the flow of the growing polymer particles through the throttling valve. In some embodiments, the stream of a gas is denominated as "dosing gas." In some embodiments, the dosing gas is fed shortly above the throttling valve. In some embodiments, the dosing gas is taken from the gas recycle line downstream of the compressor. In some embodiments, the velocity of the polymer particles within the second polymerization zone is adjusted by varying the opening of the throttling valve, varying the flow rate of the dosing gas, or varying both. In some embodiments, the throttling valve is arranged at the bottom of the lower part of the second polymerization zone.

In some embodiments, the apparatus further has a line for feeding a transport gas into an upper part of the second connecting element. In some embodiments, the transport gas stream is introduced into the second connecting element at a position close to the upper end of the second connecting element, for transferring the polymer particles from the bottom of the second polymerization zone to the bottom of the first polymerization zone. In some embodiments, the transport gas is taken from the gas recycle line downstream of the compressor. In some embodiments, the second connecting element is provided with a gas distribution grid extending from the upper end of the second connecting element for an angle A09 of at least 50° along the bending of the second connecting element.

In some embodiments, the shape of the second connecting element provides for transferring polymer particles from the second polymerization zone to the transition segment without formation of polymer deposition on the walls of the second connecting element, or formation of hot spots and melting of polymer in the second connecting element, and for minimizing polymer friction among adjacent polymer particles and between the polymer particles and the wall of the second connecting element.

In some embodiments, the diameters of the cylindrical segment of the first polymerization zone, of the upper and the lower parts of the second polymerization zone, of the gas/solid separation zone, of the first and the second connecting elements, of the gas recycle line, and of the transition segment are constant over the entire length of the component. As used herein, the term "constant diameter" refers to a diameter, which deviates from a given value by less than 5%, alternatively by less than 2%, alternatively less than 0.5%, alternatively by less than 0.1%.

In some embodiments, the first polymerization zone (that is, the region of the apparatus wherein growing polymer particles flow upward under fast fluidization or transport conditions) includes the cylindrical segment, the fifth connecting part, the sixth connecting part, parts of the transition segment, and the first connecting element. In some embodiments, the second polymerization zone include the upper cylindrical parts, the lower cylindrical parts, and the third connecting part.

The apparatus shown in FIG. 1 is an apparatus for polymerizing olefins in the gas-phase and has a first polymerization zone and a second polymerization zone, wherein the polyolefin particles pass repeatedly. Within the first polymerization zone, the polyolefin particles flow upward under fast fluidization conditions. Within the second polymerization zone, the polyolefin particles flow downward under the action of gravity. In some embodiments, the first polymerization zone has a cylindrical segment (1), and the second polymerization zone has a cylindrical upper part (5) and a cylindrical lower part (6). In some embodiments, the cylindrical segment (1) of the first polymerization zone and the upper part (5) and the lower part (6) of the second polymerization zone are interconnected by a first connecting element (3) and a second connecting element (9).

After flowing through the cylindrical segment (1) of the first polymerization zone, the polyolefin particles and the reaction gas mixture are transferred into a solid/gas separation zone (4) through the first connecting element (3), which is connected to the gas/solid separation zone (4) by a connecting piece (16). From the solid/gas separation zone (4), the polyolefin particles enter the upper part (5) of the second polymerization zone. The gas/solid separation zone (4) is connected to the upper part (5) of the second polymerization zone by a first connecting part (7a), and the upper part (5) of the second polymerization zone is connected to the lower part (6) of the second polymerization zone by a second connecting part (7b). The lower part (6) of the second polymerization zone is connected to the second connecting element (9) by a third connecting part (7c).

The reaction gas mixture leaving the gas/solid separation zone (4) is recycled to the first polymerization zone by a gas recycle line (8) and a transition segment (2). The gas recycle line (8) is equipped with a centrifugal compressor (15) having variable guide vanes (17) and a heat exchanger (14). In some embodiments, the gas recycle line (8) further has a butterfly valve (18) downstream of heat exchanger (14). Between the compressor (15) and the heat exchanger (14), a line (19) branches off for conveying a first part of the recycle gas, as a transport gas, though line (20) into the second connecting element (9) and a second part of the recycle gas, as a dosing gas, through line (21) into the lower part (6) of the second polymerization zone. The main amount of the recycle gas passes through the heat exchanger (14) and the butterfly valve (18) to the transition segment (2) and then enters the first polymerization zone, thereby establishing fast fluidization conditions therein. The gas recycle line (8) and the transition segment (2) are connected by a fourth connecting part (7d). The transition segment (2) is connected to the cylindrical segment (1) of the first polymerization zone by a fifth connecting part (7e).

In some embodiments, and for supplying the apparatus with fresh catalyst, a suspension of a solid catalyst component is fed via line (10) into the cylindrical segment (1) of the first polymerization zone. In some embodiments, the apparatus is equipped with a prepolymerization vessel or arranged in a series of polymerization reactors downstream of a polymerization reactor. In those embodiments, growing polyolefin particles are fed via line (10) into the cylindrical segment (1) of the first polymerization zone.

The cylindrical segment (1) of the first polymerization zone is connected to the first connecting element (3) by a sixth connecting part (7f).

Polyolefin particles obtained in the apparatus are continuously discharged from the lower part (6) of the second polymerization zone via the discharge line (12). In some embodiments, the entirety of or part of the make-up monomers, make-up comonomers, optional inert gases, optional additives, or combinations thereof is introduced into gas recycle line (8) via line (11). In some embodiments, a gas, a liquid, or a gas/liquid mixture is fed via line (13) into the upper part (5) of the second polymerization zone, thereby generating a barrier for preventing the reaction gas mixture of the first polymerization zone from entering the second polymerization zone.

The bottom of the third connecting part (7c) is equipped with a throttling valve (22), having an adjustable opening for adjusting the flow of polyolefin particles from the second polymerization zone into the transition segment (2). In some embodiments, the second connecting element (9) is equipped with a gas distribution grid (23), thereby ensuring transfer of the polymer particles from the second polymerization zone into transition segment (2).

Figure 2:
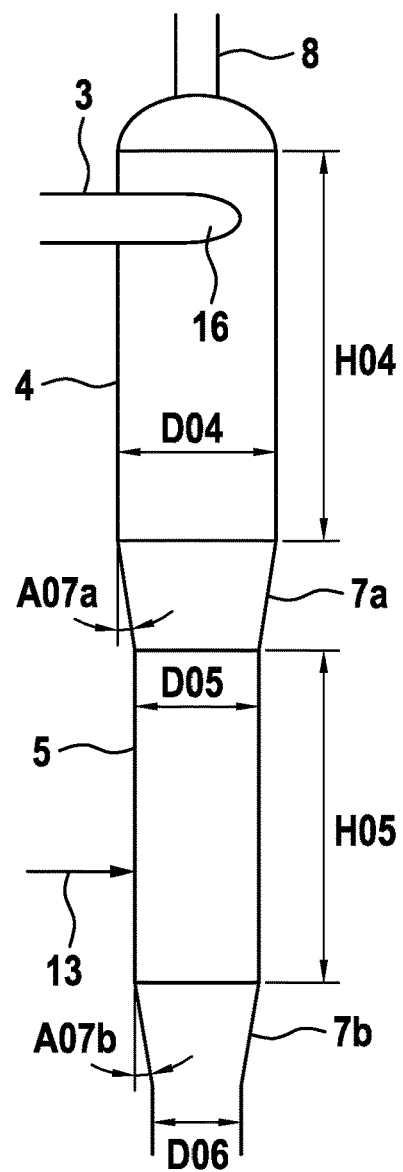
FIG. 2 is a schematic of an excerpt of a top part of a second polymerization zone.

FIG. 2 depicts a first connecting element (3), which is connected by a connecting piece (16) to a solid/gas separation zone (4) having a diameter D04 and a height H04. The solid/gas separation zone (4) is connected to an upper part (5) of the second polymerization zone having a diameter D05 and a height H05 by a first connecting part (7a), having an associated angle A07a. The upper part (5) of the second polymerization is connected to a lower part (6) of the second polymerization zone having a diameter D06 by a second connecting part (7b), having an associated angle A07b. Reaction gas separated from the polymer particles in the gas/solid separation zone (4) leaves the gas/solid separation zone (4) through gas recycle line (8). In some embodiments, a gas, a liquid, or a combination of both is fed via line (13) into the upper part (5) of the second polymerization zone, thereby preventing the reaction gas mixture of the first polymerization zone from entering the upper part (5) of the second polymerization zone.

Figure 3:
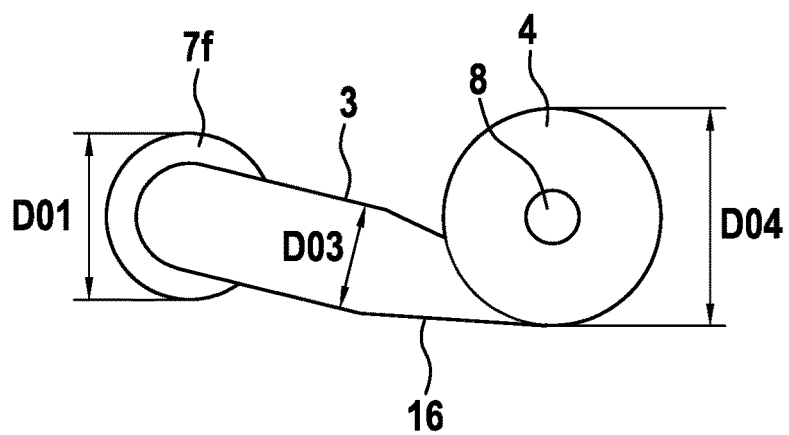
FIG. 3 is a schematic of a top view of an apparatus for carrying out a gas-phase olefin polymerization.

FIG. 3 depicts a first connecting element (3) having a diameter D03, which is, at one side, connected to a sixth connecting part (7f) and, at the other side, connected by a connecting piece (16) to a solid/gas separation zone (4) having a diameter D04. Gas recycle line (8) having a diameter D08 is arranged centrically on top of the solid/gas separation zone (4).

Figure 4:
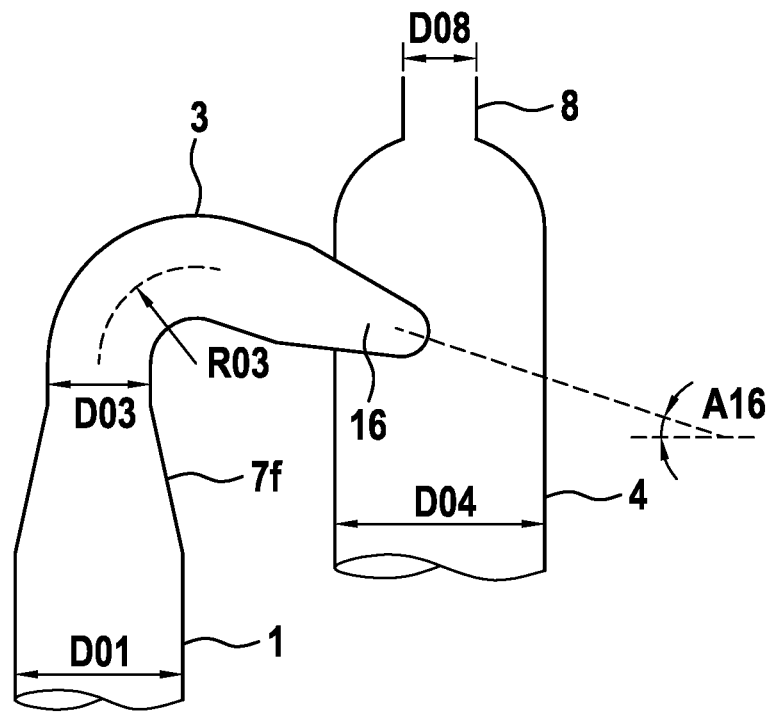
FIG. 4 is a schematic of a first connecting element.
Figure 5:
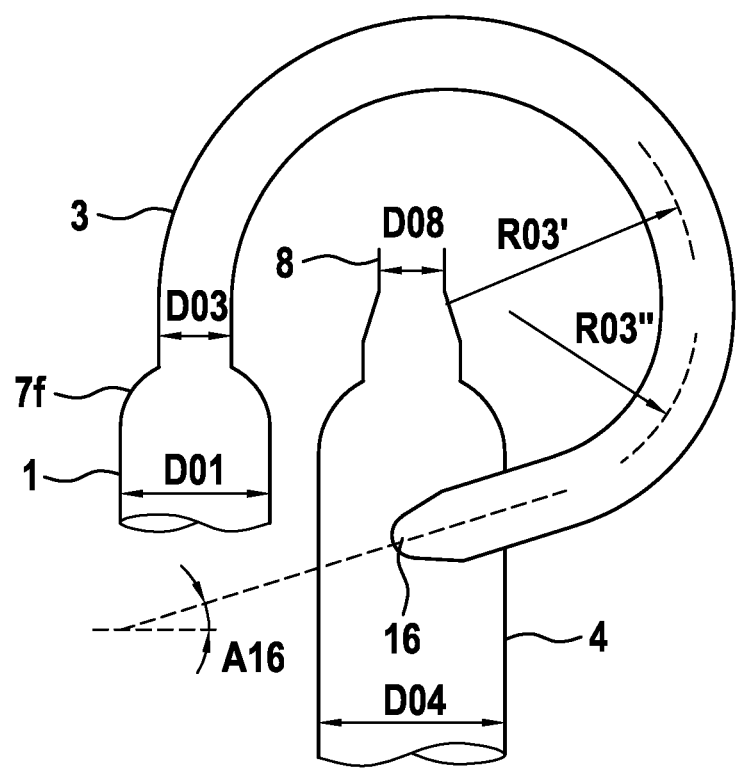
FIG. 5 is a schematic of a first connecting element.

FIG. 4 and FIG. 5 depict a first connecting element (3) having a diameter D03, which is, at one side, connected by a sixth connecting part (7f) to a cylindrical segment (1) of a first polymerization zone having a diameter D01, and, at the other side, connected by a connecting piece (16) to a solid/gas separation zone (4). Gas recycle line (8) is arranged centrically on top of the solid/gas separation zone (4). The central axis of the connecting piece (16) and the horizontal form an angle A16.

The first connecting element (3) shown in FIG. 4 is a tubular element, having a bend part having a radius R03 and a linear part.

The first connecting element (3) shown in FIG. 5 is a bend, having in a first part of the bend a radius R03' and having in a second part of the bend a radius R03".

Figure 7:
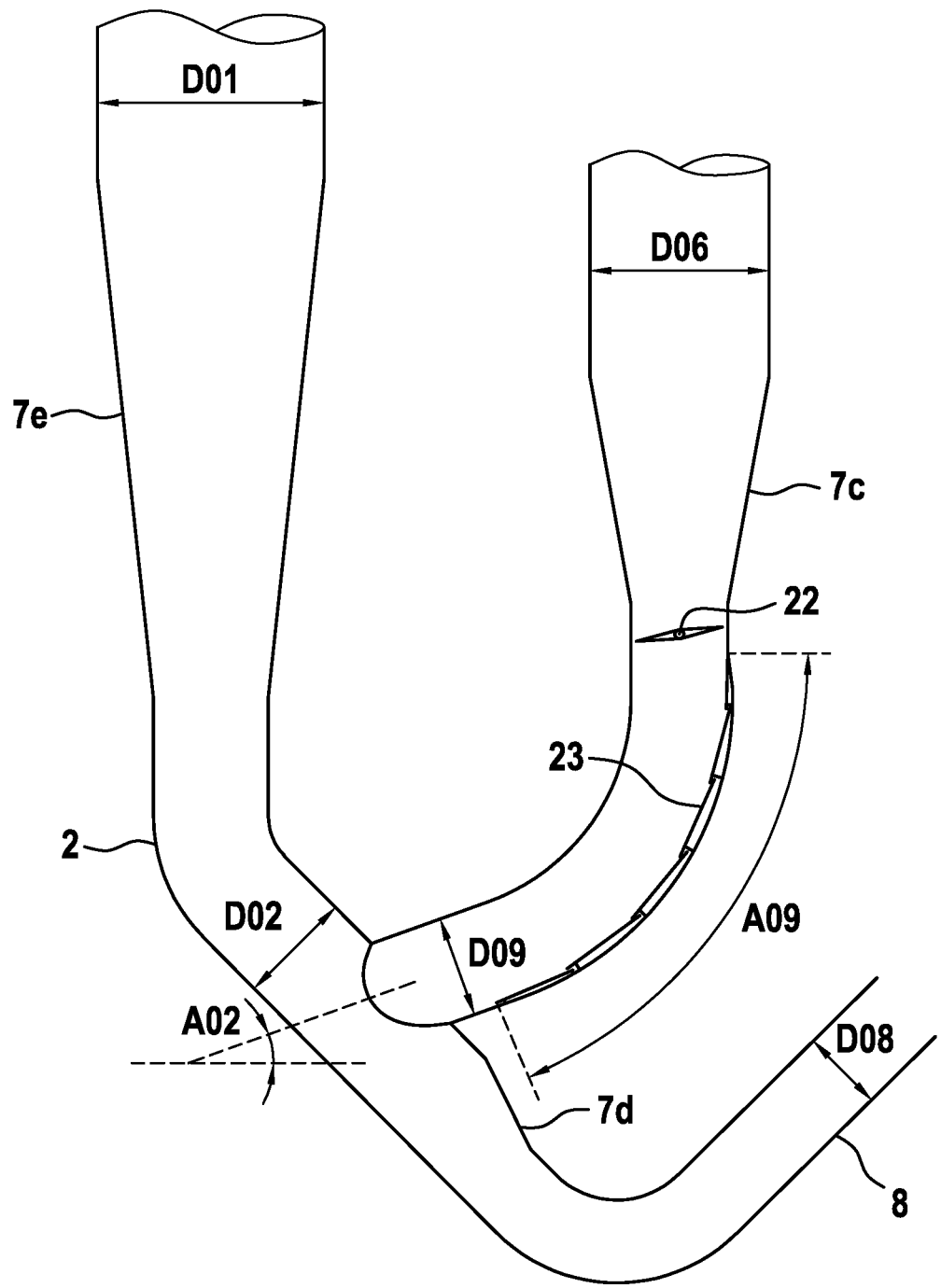
FIG. 7 is a schematic of transition segments and second connecting elements.

FIG. 7 and FIG. 8 depict a transition segment (2) having a diameter D02, which is, at one side, connected by a fifth connecting part (7e) to a cylindrical segment (1) of a first polymerization zone having a diameter D01 and, at the other side, connected by a fourth connecting part (7d) to a gas recycle line (8). A second connecting element (9) having a diameter D09 is, at one side, connected by a third connecting part (7c) to a lower part (6) of a second polymerization zone having a diameter D06 and at, the other side, connected to the transition segment (2). The central axis of the second connecting element (9) at the position where the second connecting element (9) is connected to the transition segment (2) and the horizontal form an angle A02. The second connecting element (9) is provided with a gas distribution grid (23), which extends from the upper end of the second connecting element (9) for an angle A09 along the bending of the second connecting element (9).

Figure 6:
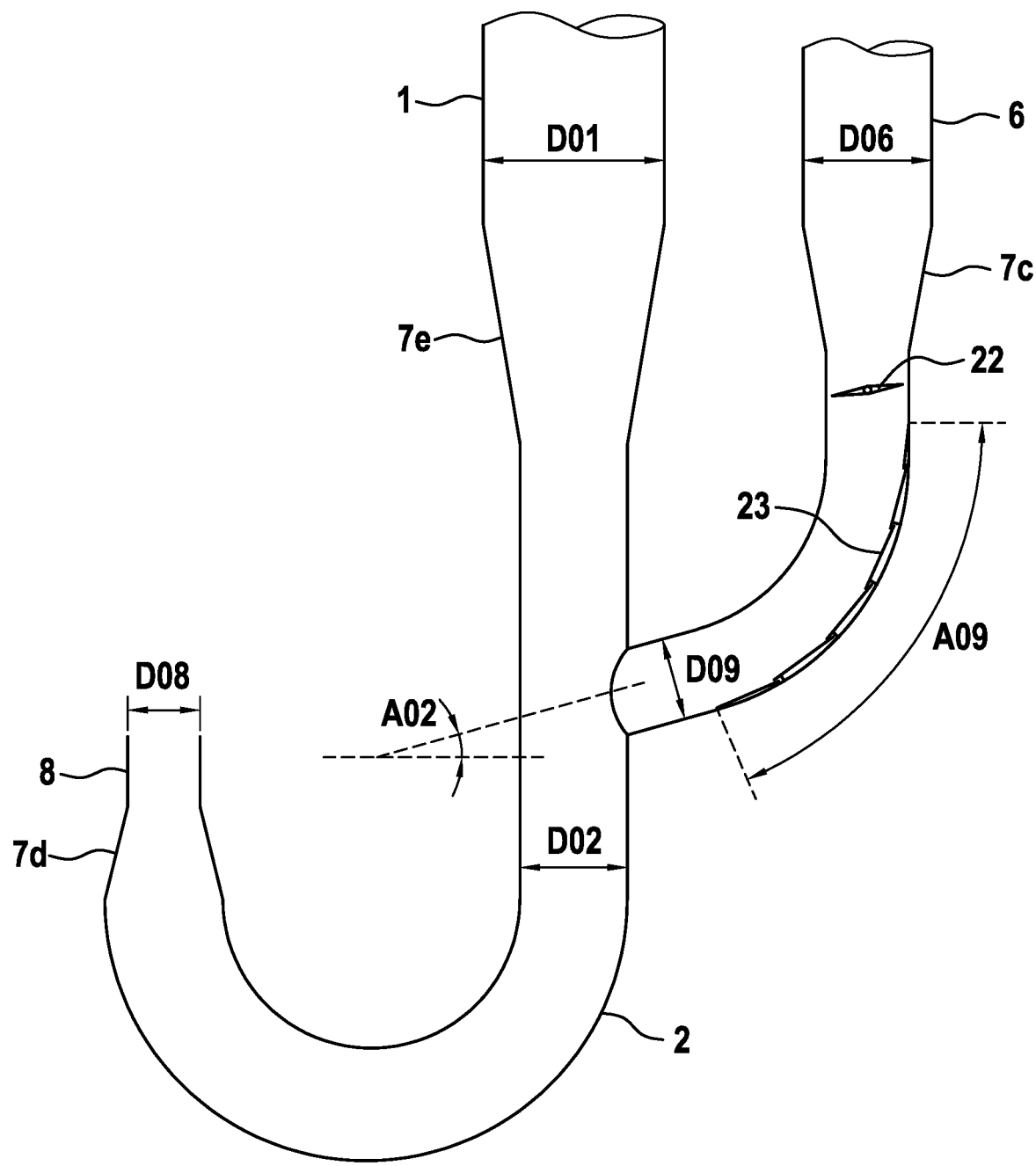
FIG. 6 is a schematic of transition segments and second connecting elements.

The transition segment (2) shown in FIG. 6 is a tubular element having a bend part and a linear part.

The transition segment (2) shown in FIG. 7 is a tubular element having two linear parts and a bend part.

In some embodiments, the present disclosure provides a process for preparing an olefin polymer including the steps of homopolymerizing an olefin or copolymerizing an olefin and one or more other olefins at temperatures of from 20° C. to 200° C. and pressures of from 0.5 MPa to 10 MPa in the presence of a polymerization catalyst, wherein the polymerization is carried out in some embodiments of the apparatus.

In some embodiments, the polymerization is a homopolymerization of ethylene, a copolymerization of ethylene and one or more other olefins selected from the group consisting of 1-butene, 1-hexene. and 1-octene, a homopolymerization of propylene, or a copolymerization of propylene and one or more other olefins selected from the group consisting of ethylene, 1-butene, and 1-hexene.

In some embodiments, the apparatus is operated at pressures of from 0.5 MPa to 10 MPa, alternatively from 1.0 MPa to 8 MPa, alternatively from 1.5 MPa to 4 MPa, wherein these pressures are absolute pressures, that is, pressure having the dimension MPa (abs). In some embodiments, the polymerization is carried out at temperatures of from 30° C. to 160° C., alternatively from 65° C. to 125° C.

In some embodiments, the polymerization in the apparatus is carried out in a condensing or super-condensing mode, wherein part of the circulating reaction gas mixture is cooled to below the dew point and returned, as a liquid-phase, a gas-phase, or a two-phase mixture, to the first polymerization zone, thereby making additional use of the enthalpy of vaporization for cooling the reaction gas.

In some embodiments, the polymerization is carried out in the presence of an inert gas. In some embodiments, the inert gas is nitrogen or an alkane having from 1 to 10 carbon atoms. In some embodiments, the alkane is selected from the group consisting of methane, ethane, propane, n-butane, isobutane, n-pentane, isopentane n-hexane, and mixtures thereof. In some embodiments, the inert gas is nitrogen or propane. In some embodiments, the polymerization is carried out in the presence of a $C_3$-$C_5$ alkane as polymerization diluent. In some embodiments, the $C_3$-$C_5$ alkane is propane. In some embodiments, the homopolymerization or copolymerization of ethylene is carried out in the presence of propane. In some embodiments, the reaction gas mixture has a content of inert components from 30 to 99 vol. %, alternatively from 40 to 95 vol. %, alternatively from 45 to 85 vol. %. In some embodiments, the main monomer is propylene, and an inert diluent is absent or present in minor amounts.

In some embodiments, the reaction gas mixtures within the apparatus are further made from or containing the olefins to be polymerized, that is, a main monomer and one or more optional comonomers. In some embodiments, the reaction gas mixture is further made from or containing additional components. In some embodiments, the additional components are antistatic agents or molecular weight regulators. In some embodiments, the molecular weight regulator is hydrogen. In some embodiments, the components of the reaction gas mixture are fed into the polymerization zones or into the gas recycle line in gaseous form or as liquid which then vaporizes within the polymerization zones or the gas recycle line.

In some embodiments, the polymerization of olefins is carried out using Ziegler- or Ziegler-Natta-catalysts, using Phillips catalysts based on chromium oxide, or using single-site catalysts. As used herein, the term "single-site catalysts" refers to catalysts based on chemically uniform transition metal coordination compounds. In some embodiments, mixtures of two or more of these catalysts are used for the polymerization of olefins. As used herein, the mixed catalysts are designated as "hybrid catalysts."

In some embodiments, the catalysts are of the Ziegler or Ziegler-Natta type. In some embodiments, the catalysts are made from or containing a compound of titanium or vanadium, a compound of magnesium, optionally an electron donor compound, and optionally a particulate inorganic oxide as a support material.

In some embodiments, catalysts of the Ziegler or Ziegler-Natta type are used in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, cocatalysts are selected from the group consisting of organometallic alkyls, organometallic alkoxides, and organometallic halides.

In some embodiments, organometallic compounds are made from or containing lithium alkyls, magnesium or zinc alkyls, magnesium alkyl halides, aluminum alkyls, silicon alkyls, silicon alkoxides, and silicon alkyl halides. In some embodiments, organometallic compounds are made from or containing aluminum alkyls and magnesium alkyls. In some embodiments, organometallic compounds are made from or containing aluminum alkyls, alternatively trialkylaluminum compounds or compounds of this type wherein an alkyl group is replaced by a halogen atom. In some embodiments, the halogen atom is chlorine or bromine. In some embodiments, the aluminum alkyls are selected from the group consisting of trimethylaluminum, triethylaluminum, tri-isobutylaluminum, tri-n-hexylaluminum or diethylaluminum chloride, and mixtures thereof.

In some embodiments, the polymerization takes place in an apparatus which is a part of a series of polymerization reactors. In some embodiments, one or more polymerizations in other gas-phase reactors of a series of polymerization reactors occur according to polymerizations disclosed herein. In some embodiments, combinations of polymerizations reactors include a fluidized-bed reactor followed by an apparatus disclosed herein. In some embodiments, combinations of polymerizations reactors include an apparatus disclosed herein followed by a fluidized-bed reactor.

LIST OF REFERENCE SIGNS 1 first polymerization zone
2 transition segment
3 first connecting element
4 gas/solid separation zone
5 upper part of the second polymerization zone
6 lower part of the second polymerization zone
7a first connecting part connecting the gas/solid separation zone and the upper part of the second polymerization zone
7b second connecting part connecting the upper part and the lower part of the second polymerization zone
7c third connecting part connecting the lower part of the second polymerization zone and the second connecting element
7d fourth connecting part connecting the gas recycle line and the transition segment
7e fifth connecting part connecting the transition segment and the first polymerization zone
7f sixth connecting part connecting the first polymerization zone and the first connecting element
8 gas recycle line
9 second connecting element
10 catalyst feeding line or feeding line for polymer particles from an upstream polymerization reactor
11 monomer feeding line
12 polymer discharge line
13 barrier gas/liquid feeding line
14 heat exchanger
15 compressor
16 connecting piece connecting the first connecting element and the gas/solid separation zone
17 guide vanes
18 butterfly valve
19 recycle gas branch-off line
20 transport gas feeding line
21 dosing gas feeding line
22 throttling valve
23 gas distribution grid

The invention claimed is:

1. An apparatus for carrying out a gas-phase olefin polymerization comprising
a first polymerization zone, adapted and arranged for growing polymer particles to flow upward under fast fluidization or transport conditions, comprising a cylindrical segment having a diameter D01;
a second polymerization zone, adapted and arranged for the growing polymer particles to flow downward, comprising a cylindrical upper part having a diameter D05 and a cylindrical lower part having a diameter D06;
a gas/solid separation zone of a cylindrical shape having a diameter D04, adapted and arranged for separating growing polymer particles from a gas flow, which is arranged on top of the upper part of the second polymerization zone and is directly connected to the upper part of the second polymerization zone;
a tubular first connecting element having a diameter D03, adapted and arranged for connecting the cylindrical segment of the first polymerization zone to the gas/solid separation zone;
a tubular gas recycle line having a diameter D08, adapted and arranged for connecting the gas/solid separation zone to the first polymerization zone;
a tubular transition segment having a diameter D02, arranged between the gas recycle line and the cylindrical segment of the first polymerization zone; and
a tubular second connecting element having a diameter D09, adapted and arranged for connecting the lower part of the second polymerization zone to the transition segment;
wherein the gas recycle line is equipped with a compressor, adapted and arranged for circulating gas in the gas recycle line, and a heat exchanger, adapted and arranged for removing heat from the gas flowing in the gas recycle line;
wherein the ratio of D04 to D05 is from 1.0 to 1.5 and the ratio of D05 to D06 is from 1.2 to 2;
wherein the first connecting element is a bend having a radius R03 or is a tubular element comprising one or more bend parts having one or more radiuses R03 and one or more linear parts, the ratio of R03 to D03 is from 1 to 6, and the ratio of D03 to D01 is from 0.3 to 0.85;
wherein the first connecting element comprises a connecting piece, the first connecting element and the gas/solid separation zone are connected by the connecting piece, and the connection of the connecting piece to the gas/solid separation zone is tangential and has an inclination, so that the central axis of the connecting piece and the horizontal form, an angle A16 in the range from 0° to 40°;
wherein the transition segment is a bend or a tubular element comprising one or more bend parts and one or more linear parts and the ratio of D08 to D02 is 1.0 to 2.2; and
wherein the second connecting element is a bend or a tubular element comprising one or more bend parts and one or more linear parts.

2. The apparatus of claim 1, wherein the central axis of the second connecting element at the position where the second connecting element is connected to the transition segment and the horizontal form an angle A02 in the range from 0° to 40°.

3. The apparatus of claim 1, wherein the apparatus further comprises a line for feeding a barrier gas, a barrier liquid, or a combined gas/liquid barrier into the upper part of the second polymerization zone.

4. The apparatus of claim 1, wherein the apparatus further comprises a line for feeding a transport gas into an upper part of the second connecting element.

5. The apparatus of claim 4, wherein the second connecting element is provided with a gas distribution grid extending from the upper end of the second connecting element for an angle A09 of at least 50° along the bending of the second connecting element.

6. The apparatus of claim 1, wherein the second polymerization zone comprises a throttling valve, and the apparatus further comprises a line for feeding a dosing gas into the lower part of the second polymerization zone at one or more positions above the throttling valve.

7. The apparatus of claim 1, wherein the compressor is a centrifugal compressor comprising variable guide vanes, and the gas recycle line is further equipped with a butterfly valve.

8. The apparatus of claim 7, wherein the variable guide vanes are arranged upstream of the centrifugal compressor, and the butterfly valve is arranged downstream of the centrifugal compressor.

9. The apparatus of claim 1, wherein the gas/solid separation zone has a height H04, and the ratio of H04 to D04 is 2.5 to 4.5.

10. The apparatus of claim 1, wherein the upper part of the second polymerization zone has a height H05, and the ratio of H05 to D05 is 2 to 4.

11. The apparatus of claim 1, wherein the apparatus is part of a series of polymerization reactors.

12. A process for carrying out a gas-phase olefin polymerization in the apparatus of claim 1 at temperatures of from 20° C. to 200° C. and pressures of from 0.5 MPa to 10 MPa, in the presence of a polymerization catalyst, comprising the steps of:
   (a) feeding one or more olefins into the apparatus,
   (b) contacting the olefins and the polymerization catalyst under reaction conditions, and
   (c) discharging the polymer product from the apparatus, wherein the growing polymer particles
      (i) flow upward through the first polymerization zone under fast fluidization or transport conditions,
      (ii) leave the first polymerization zone,
      (iii) pass through the gas/solid separation zone,
      (iv) enter the second polymerization zone,
      (v) flow downward under the action of gravity,
      (vi) leave the second polymerization zone, and
      (vii) are reintroduced, at least partially, into the first polymerization zone,
   thereby establishing a circulation of polymer between the first polymerization zone and the second polymerization zone, wherein the second polymerization zone comprises a bed of densified polymer particles.

13. The process of claim 12, wherein introducing a gas or liquid into the second polymerization zone via a feeding line prevents completely or partially the gas mixture in the first polymerization zone from entering the upper part of the second polymerization zone, and the gas mixture in the second polymerization zone differs from the gas mixture in the first polymerization zone.

14. The process of claim 13, wherein the surface of the bed of densified polymer particles is located in the upper part of the second polymerization zone.

15. The process of claim 12, wherein the polymerization is a homopolymerization of ethylene, or a copolymerization of ethylene and one or more other olefins selected from the group consisting of 1-butene, 1-hexene, and 1-octene, a homopolymerization of propylene, or a copolymerization of propylene and one or more other olefins selected from the group consisting of ethylene, 1-butene and 1-hexene.

16. The process of claim 12, wherein the central axis of the second connecting element at the position where the second connecting element is connected to the transition segment and the horizontal form an angle A02 in the range from 0° to 40°.

17. The process of claim 12, wherein the apparatus further comprises a line for feeding a transport gas into an upper part of the second connecting element, and the second connecting element is provided with a gas distribution grid extending from the upper end of the second connecting element for an angle A09 of at least 50° along the bending of the second connecting element.

18. The process of claim 12, wherein the gas/solid separation zone has a height H04, and the ratio of H04 to D04 is 2.5 to 4.5.

19. The process of claim 12, wherein the upper part of the second polymerization zone has a height H05, and the ratio of H05 to D05 is 2 to 4.

20. The process of claim 12, wherein the apparatus is part of a series of polymerization reactors.

* * * * *